United States Patent [19]

Okano et al.

[11] Patent Number: 5,402,197
[45] Date of Patent: Mar. 28, 1995

[54] CAMERA SHAKE ALARMING APPARATUS

[75] Inventors: Hiroshi Okano, Toyko; Tadao Kai; Kazuharu Imafuji, both of Kawasaki; Akira Katayama, Koganei, all of Japan

[73] Assignee: Nikon Corporation, Tokyo, Japan

[21] Appl. No.: 109,905

[22] Filed: Aug. 23, 1993

[30] Foreign Application Priority Data

Sep. 4, 1992 [JP] Japan .................................. 4-263126

[51] Int. Cl.⁶ ............................................. G03B 13/36
[52] U.S. Cl. ................................... 254/400; 354/410; 354/266; 354/195.1; 354/289.12
[58] Field of Search ............................... 354/400–408, 354/410, 266, 289.1, 289.12, 195.1

[56] References Cited

U.S. PATENT DOCUMENTS

| 4,448,510 | 5/1984 | Murakoshi | 354/289.12 |
| 4,896,177 | 1/1990 | Kazami et al. | 354/195.1 |
| 5,204,709 | 4/1993 | Sato | 354/266 |

FOREIGN PATENT DOCUMENTS 2-126249 5/1990 Japan .

*Primary Examiner*—Russell E. Adams
*Attorney, Agent, or Firm*—Shapiro and Shapiro

[57] ABSTRACT

A camera shake alarming apparatus comprises a storage portion for storing specification information of a camera; a subject distance detecting portion for detecting a subject distance for photographing a subject; a calculating portion for calculating an allowable camera shake quantity on the basis of a shutter speed set in the camera when photographing the subject, the camera specification information stored in the storage portion and the subject distance detected by the subject distance detecting portion; a camera shake detecting portion for detecting a camera shake quantity of the camera; a comparing portion for comparing the allowable camera shake quantity calculated by the calculating portion with the camera shake quantity detected by the camera shake detecting portion; and an alarming portion for giving an alarm for the camera shake according to a compared result of the comparison portion.

5 Claims, 4 Drawing Sheets

CAMERA SHAKE ALARMING APPARATUS

BACKGROUND OF THE INVENTION

1. Field of the Invention

The present invention relates to a camera shake alarming apparatus suitable for use with, e.g., a camera.

2. Related Background Art

When taking a photo by a conventional camera held with hands, and if, for instance, a lens having a large focal length is employed, or if a shutter speed is decreased, an image blur of the photo is produced by an influence of a camera shake. This may result in a degradation of picture quality thereof in some cases.

Under such circumstances, the cameras offered of recent years have been constructed so that the camera shake can be compensated by moving some parts or the entire optical system (lens groups) in a direction orthogonal to the optical axis to cancel the camera shake.

The camera described above have also been constructed to give an alarm indicating that the picture quality of the photo will be degraded due to the camera shake if the camera shake can not be (entirely) compensated because of a large amount of camera shake even by moving the optical system to, as explained earlier, cancel the camera shake.

Another type of camera is known in which there is no provision for shake compensation, but if the amount of camera shake is large enough to degrade the picture quality of the photo, an alarm therefor is given.

That is, as disclosed in, e.g., Japanese Patent Application Laid-open No. 2-126249, a limit shutter speed as a shutter speed at which excessive camera shake begins to occur is calculated based on the focal length of the lens. This limit shutter speed is compared with a shutter speed set in the camera when taking the photo. Then, the alarm for the camera shake is given according to this comparison result.

Incidentally, if a magnification during the photography is large in this type of camera, the camera is regarded to be fixed to, e.g., a tripod or the like, and the arrangement is such that no alarm for the camera shake may be given.

The limit shutter speed is, as explained above, determined based on the focal length of the lens. The limit shutter speed therefore becomes a fixed value depending on the lens irrespective of the magnification when performing the photography. However, even if the amount of camera shake is the same on the camera side, an image blur of the photo increases in proportion to an image magnification.

Hence, when taking the photo by decreasing the image magnification, there arises a problem in which the alarm for the camera shake is unnecessarily given depending on the shutter speed set in the camera regardless of the fact that there is almost no image blur of the photo due to the camera shake.

Further, if the optical system of the camera is of a so-called inner focus optical system, the focal length of the lens constituting the optical system thereof varies depending on a subject distance. Nevertheless, the limit shutter speed described above is calculated, with the focal length regarded as a fixed value.

For this reason, an error is produced in the limit shutter speed. The alarm for the camera shake is still unnecessarily given. Further, the alarm for the camera shake may be required, but not given in some cases.

SUMMARY OF THE INVENTION

The present invention, which has been devised under such circumstances, aims at reliably giving an alarm indicating that an image blur is to be produced due to a camera shake.

A camera shake alarming apparatus in one embodiment of the present invention comprises a storage portion 8 for storing camera specification information such as focal lengths of, e.g., a fixed lens group L1, a focus lens group L2 or a compensation lens group L3. The camera shake alarming apparatus also comprises a subject distance detection circuit 12 serving as a subject distance detecting means for detecting a subject distance for photographing a subject and an allowable camera shake quantity calculation circuit 4 serving as a calculating means for calculating an allowable camera shake on the basis of a shutter speed set in the camera when photographing the subject, the camera specification information stored in the storage portion 8 and the subject distance detected by the subject distance detection circuit 12. The camera shake alarming apparatus further comprises a camera shake detection circuit 3 defined as a camera shake detecting means for detecting a camera shake quantity of the camera, a comparing circuit 5 defined as a comparing means for comparing the allowable camera shake quantity calculated by the allowable camera shake quantity calculation circuit 4 with the camera shake quantity detected by the camera shake detection circuit 3. The alarming apparatus still further comprises an alarming circuit 13 defined as an alarming means for giving an alarm for the camera shake, corresponding to a compared result of the comparing circuit 5.

According to the camera shake alarming apparatus in an embodiment, a subject distance for photographing the subject is detected. An allowable camera shake quantity is calculated based on this subject distance, the shutter speed set in the camera and the camera specification information, stored in the storage portion 8, such as the focal lengths of the fixed lens group L1, the focus lens group L2 or the compensation lens group L3. At the same time, the camera shake quantity of the camera is detected. Then, this camera shake quantity of the camera is compared with the allowable camera shake quantity. According to the comparison result thereof, the alarm for the camera shake is given by way of, e.g., an alarming sound. Hence, it is possible to reliably give the alarm indicating that an image blur is to be produced in the photo due to the camera shake. The image blur can be prevented beforehand from appearing on the photo.

The camera shake alarming apparatus in another embodiment further comprises a driving circuit 10 serving as a compensating means for compensating the camera shake of the camera and a compensation lens group L3. The alarming apparatus causes the allowable camera shake quantity calculation circuit 4 to calculate the allowable camera shake quantity on the basis of the shutter speed set in the camera when photographing the subject, the camera specification information stored in the storage portion 8, the subject distance detected by the subject distance detection circuit 12 and, in addition, the camera shake compensation quantity of the camera which is given by the compensation lens group L3 in combination with the driving circuit 10.

In the camera shake alarming apparatus in accordance with this embodiment, the camera shake of the camera is compensated. The alarming apparatus causes the allowable camera shake calculation circuit 4 to calculate the allowable camera shake quantity on the basis of the shutter speed set in the camera, the camera specification information stored in the storage portion 8, the subject distance detected by the subject distance detection circuit and, in addition, the camera shake compensation quantity of the camera. It is therefore feasible to reliably give the alarm indicating that the image blur is to be produced on the photo because of the incompletely compensated camera shake.

The camera shake alarming apparatus in still another embodiment comprises the storage portion 8 serving as a storing means for storing the camera specification information such as a focal length of, e.g., the fixed lens group L1 or the focus lens group L2 and the subject distance detection circuit 12 serving as a subject distance detecting means for detecting a subject distance for photographing the subject. The camera shake alarming apparatus also comprises a shutter speed calculation circuit 21 defined as a calculating means for calculating an allowable shutter speed on the basis of the camera specification information stored in the storage portion 8 and the subject distance detected by the subject distance detection circuit 12. The camera shake alarming apparatus further comprises a comparing circuit 22 defined as a comparing means for comparing the shutter speed set in the camera when photographing the subject with the allowable shutter speed calculated by the shutter speed calculation circuit 21 and the alarming circuit 13 defined as an alarming means for giving an alarm for the camera shake, according to a comparison result of the comparing circuit 22.

In the camera shake alarming apparatus in accordance with this embodiment, the subject distance for photographing the subject is detected. The allowable shutter speed is calculated based on this subject distance and the camera specification information, stored in the storage portion 8, such as the focal length of the fixed lens group L1 or the focus lens group L2. Then, the shutter speed set in the camera is compared with the allowable shutter speed. An alarm for the camera shake is given corresponding to a compared result thereof. It is therefore possible to reliably give the alarm indicating that the image blur is to be produced on the photo due to the camera shake. The image blur can be thereby prevented beforehand from appearing on the photo.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Figure 1:
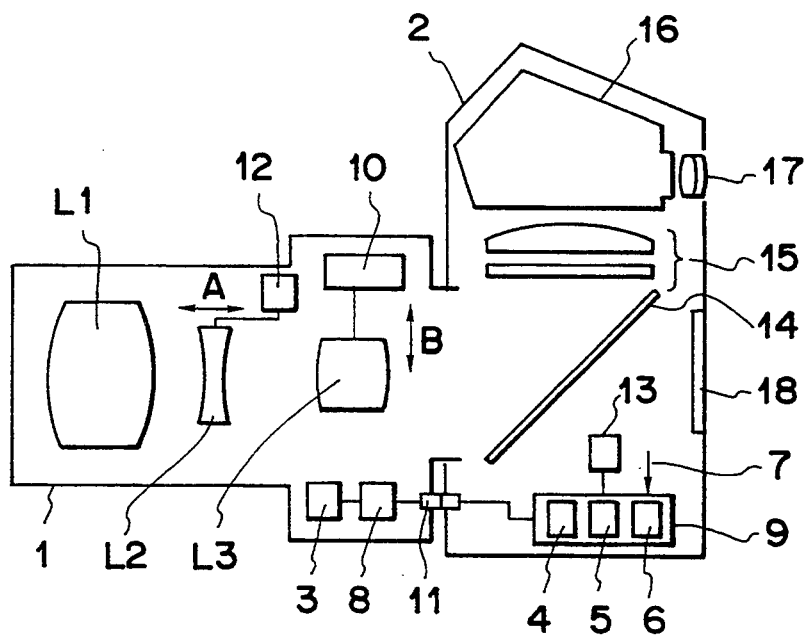
FIG. 1 is a block diagram illustrating a construction of one embodiment of a camera to which a camera shake alarming apparatus of this invention is applied.

FIG. 1 is a block diagram illustrating a construction of one embodiment of a camera to which a camera shake alarming apparatus of this invention is applied. This camera is constructed of an interchangeable lens unit 1 and a camera body unit 2. The light falls on a fixed lens group L1 of the interchangeable lens unit 1. This light is then incident on a mirror 14 via a focus lens group L2 and a compensation lens group L3. The focus lens group L2 performs focusing while moving in the optical axis directions (indicated by arrowheads A in the Figure). The compensation lens group L3 compensates a camera shake with movements in directions perpendicular to the optical axis (moving within a plane perpendicular to the sheet surface, including arrowheads B in the Figure). The mirror 14 reflects the light penetrating the compensation lens group L3 toward a focusing screen element 15. The same image as that formed in a film 18 is formed on the focusing screen element 15. Further, the mirror 14 is, on depressing a release button (shutter button) (not shown), housed in a lower part of the focusing screen element 15 but permits the film 18 to be irradiated with the light from the compensation lens group L3. The film 18 is thus exposed.

The image formed on the focusing screen element 15 is the same as that formed on the film 18. The light of this image is incident on a prism 16 when the mirror 14 is housed in the lower part of the focusing screen element 15 upon depressing the release button. The prism 16 reflects the light of the image formed on the focusing screen element 15 several times and thus permits an outgoing of the light toward an eyepiece 17. With the actions given above, it is possible to confirm the same image formed on the film 18 as that formed on the focusing screen element 15.

Note that the fixed lens group L1, the focus lens group L2 and the compensation lens group L3 are sequenced in the interchangeable lens unit 1, however, the sequence of the focus lens group L2 and the compensation lens group L3 may be changed.

A camera shake detection circuit 3 incorporates a speed sensor or an angular speed sensor. A speed of vibrations of the camera or an angular speed thereof is detected as a camera shake quantity. The camera shake quantity detected by the camera shake detection circuit 3 is inputted via a storage portion 8 and a contact 11 to a comparing circuit 5 and a camera shake compensation control circuit 6 which constitute a control module 9 within the camera body unit 2. The camera shake compensation control circuit 6 calculates a camera shake compensation quantity on the basis of the camera shake quantity given from the camera shake detection circuit 3. The calculated camera shake compensation quantity is outputted to an allowable camera shake quantity calculation circuit 4 and a driving circuit 10. The driving circuit 10 is controlled by the camera shake compensation control circuit 6 and moves (propels) the compensation lens L3, corresponding to the camera shake compensation quantity outputted therefrom.

The storage portion 8 consists of only a ROM or of the ROM and a CPU (both are unillustrated) for managing inputting and outputting of information to and from the ROM. Stored previously in this storage portion 8 are pieces of camera specification information such as focal lengths of the fixed lens group L1, the focus lens group L2 or the compensation lens group L3. The allowable camera shake quantity calculation circuit 4 of the control module 9 is, when read from the storage portion 8, supplied with the camera specification information, stored therein, about the focal lengths of the fixed lens group L1, the focus lens group L2 or the compensation lens group L3.

A subject distance detection circuit 12 calculates a subject distance, i.e., a distance from the camera to a subject which is to be Shot in accordance with a position of the focus lens group L2. The subject distance is then supplied to the allowable camera shake quantity calculation circuit 4 of the control module 9.

Photographing condition information 7 is information outputted from a setting portion (not shown) for setting, e.g., a shutter speed and an aperture and set in the camera. The photographing condition information 7 is inputted to the allowable camera shake quantity calculation circuit 4 of the control module 9.

The allowable camera shake quantity calculation circuit 4 calculates an allowable camera shake quantity on the basis of the camera specification information, supplied from the storage portion 8, such as the focal lengths of the fixed lens group L1, the focus lens group L2 or the compensation lens group L3. This calculation is also based on the subject distance given from the subject distance detection circuit 12 and the camera set shutter speed contained in the photographing condition information 7 or, if the camera shake compensating function is active, in addition to those described above, the camera shake quantity given from the camera shake compensation control circuit 6.

Figure 2:
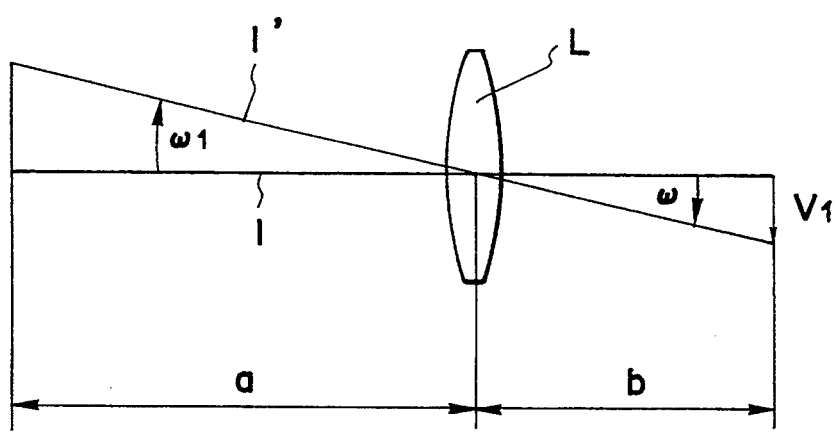
FIG. 2 is an explanatory view showing a relationship of a camera tilt angular speed $\omega_1$ versus an image blur on a film 18.

Herein, a relationship of the camera tilt angular speed $\omega_1$ versus an image blur on the film 18 will be explained with reference to FIG. 2. An image forming formula is given by:

$$1/a + 1/b = 1/F \qquad (1)$$

where a is the distance from the lens L to the subject, b is the distance from the lens L to an image forming surface, and F is the focal length of the lens L. Supposing that the optical axis I is, with a tilt of the lens L (camera), inclined as indicated by the optical axis I' at the angular speed $\omega_1$, the velocity $v_1$ at which the image on the image forming surface (the film 18) moves is expressed such as:

$$v_1 = b \times \omega_1 \qquad (2)$$

The formula (1) is transformed and substituted into the formula (2). The result is:

$$v_1 = a \times F \times \omega_1 / (a - F) \qquad (3)$$

When the image on the image forming surface (film 18) moves at the velocity $v_1$, the blur quantity $d_1$ of the image on the image forming surface (film 18) is given by:

$$d_1 = v_1 \times t_c \qquad (4)$$

where $t_c$ is the shutter speed set in the camera.

If the blur quantity $d_1$ of this image is smaller than the diameter $\delta$ (e.g., approximately 1/30 mm) of, e.g., an allowable confusion circle in the camera, i.e., if the following relationship is satisfied, it follows that the image blur does not become conspicuous.

$$d_1 < \delta \qquad (5)$$

By using the formulae (3), (4), the formula (5) is transformed as follows:

$$a \times F \times \omega_1 \times t_c / (a - F) < \delta \qquad (6)$$

The allowable camera shake quantity calculation circuit 4 therefore calculates the maximum angular speed $\omega_1$ which meets the formula (6) from the focal length F given from the storage portion 8, the subject distance a given from the subject distance detection circuit 12 and the camera set shutter speed $t_c$ contained in the photographing condition information 7. This value is outputted as the allowable camera shake quantity $\omega_1$ to the comparing circuit 5.

Note that the camera shake compensating function of the camera is active, and if the image on the film 18 can be thereby moved at the velocity (compensation velocity) $v_2$ (if the camera shake can be compensated), the image blur quantity $d_1$ after compensating the camera shake is expressed by:

$$d_1 = (v_1 - v_2) t_c \qquad (4)'$$

Hence, when the camera shake compensating function of the camera is active, the allowable camera shake quantity calculation circuit 4 calculates the maximum angular speed $\omega_1$ which satisfies the formula obtained by substituting the formulae (3), (4) into the formula (5) and outputs it as the allowable camera shake quantity $\omega_1$. This value is calculated from the focal length F given from the storage portion 8, the subject distance a given from the subject distance detection circuit 12, the camera set shutter speed $t_c$ contained in the photographing condition information 7 and the compensation velocity $v_2$ given from the camera shake compensation control circuit 6.

The comparing circuit 5 compares the allowable camera shake quantity $\omega_1$ outputted from the allowable camera shake quantity calculation circuit 4 with a camera shake quantity $\omega$ detected by the camera shake detection circuit 3. If the camera shake quantity $\omega$ is larger than the allowable camera shake quantity $\omega_1$, a control signal is outputted to an alarming circuit 13. In response to the control signal from the comparing circuit 5, the alarming circuit 13 emits an alarming sound through, e.g., a built-in loudspeaker (unillustrated), thus informing the photographer of an occurrence of the image blur on the photo.

Figure 3:
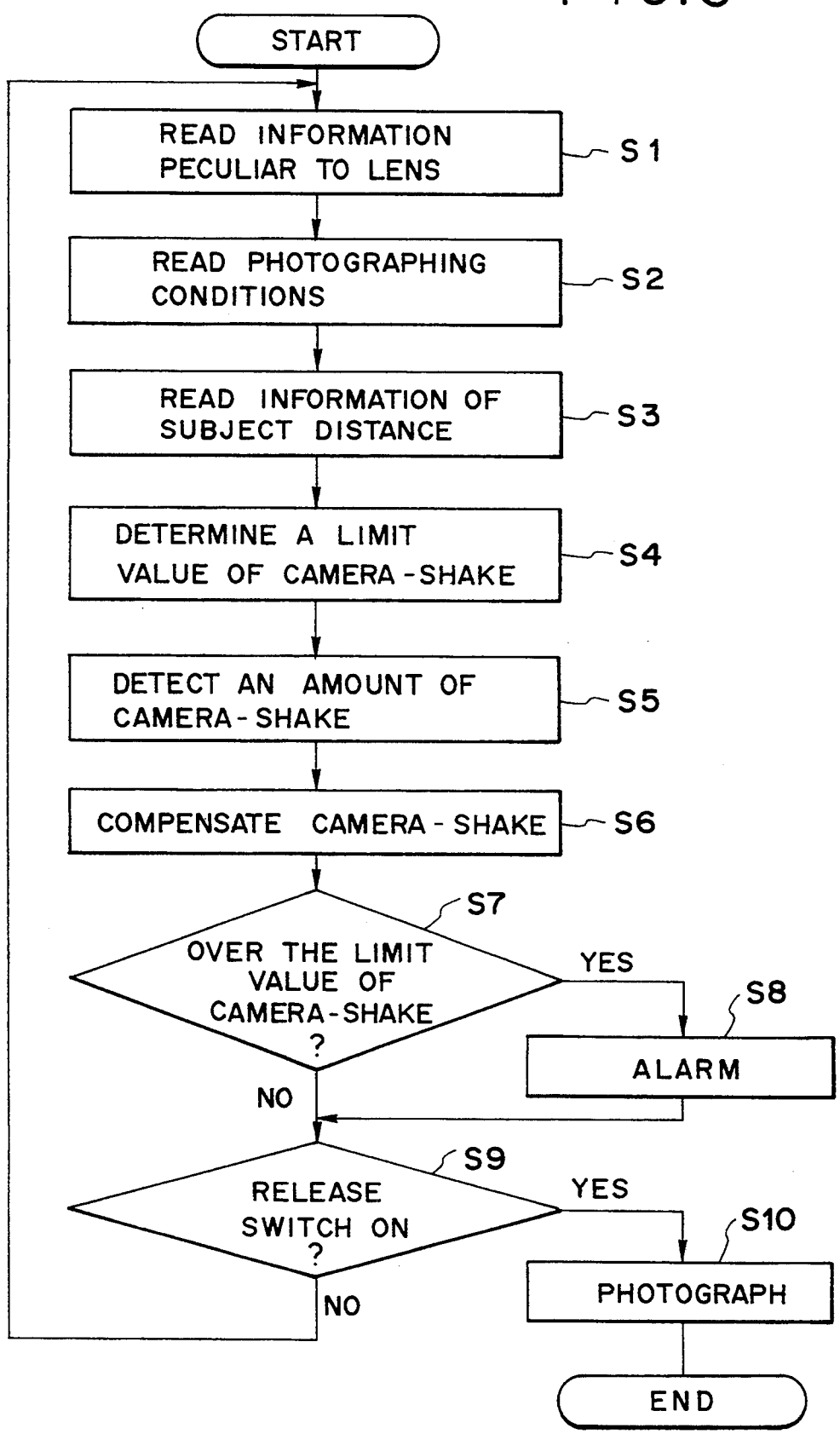
FIG. 3 is an explanatory flowchart showing the operation of the embodiment shown in FIG. 1.

Next, the operation thereof will be explained with reference to a flowchart of FIG. 3. When turning ON a main switch (not shown) of the camera, the focal length stored in the storage portion 8 is read and outputted to the allowable camera shake quantity calculation circuit 4 in step S1. The action then proceeds to step S2. In step S2, the camera set shutter speed contained in the photographing condition information 7 is read to the allowable camera shake quantity calculation circuit 4. The action then proceeds to step S3. The subject distance detection circuit 12 calculates the subject distance from a position of the focus lens group L2. The subject distance is read to the allowable camera shake quantity calculation circuit 4, and the action goes forward to step S4.

In step S4, as explained earlier, the allowable camera shake quantity calculation circuit 4 calculates the allowable camera shake quantity from the focal length, the shutter speed set in the camera, the subject distance and the amount of camera shake compensation by the compensation lens L3. The action proceeds to step S5, wherein the camera shake detection circuit 3 detects a camera shake quantity. The action then proceeds to step S6.

Based on the camera shake quantity detected in step S5, the compensation lens L3 is driven by the driving circuit 10 in step S6. The camera shake is thus compensated. The action goes forward to step S7. Judged therein is whether or not the camera shake quantity detected in step S5 is larger than the allowable camera shake quantity calculated in step S4. If it is judged in step S7 that the camera shake quantity is not larger than the allowable camera shake quantity, the action skips over step S8 to step S9.

If it is judged in step S7 that the camera shake quantity is larger than the allowable camera shake quantity, the action proceeds to step S8. The alarming circuit 13 gives forth the alarming sound.

Then, the action proceeds to step S9, wherein whether the release button is depressed (fully depressed) or not is judged. If it is judged in step S9 that the release button is not depressed, the action goes back to step S1. The actions from step S1 to step S9 are repeated until the depression of the release button is judged in step S9.

If it is judged in step S9 that the release button is depressed, the action goes forward to step S10. The shutter (not shown) is propelled, and the film 18 is thereby exposed, viz., a photo is taken. The action comes to an end.

Note that the camera body unit 2 incorporates the control module 9 constructed of the allowable camera shake quantity calculation circuit 4, the comparing circuit 5 and the camera shake compensation control circuit 6 in the embodiment shown in FIG. 1. Some or all of these components may be provided in the interchangeable lens unit 1.

Further, in this embodiment, the camera shake detection circuit 3 outputs the angular speed indicating a rotating speed of the camera as the camera shake quantity. However, instead of the angular speed, velocity showing a moving direction of the camera and a speed thereof can be outputted. In this case, however, the allowable camera shake quantity calculation circuit 4 calculates the allowable camera shake quantity in accordance with the formulae (4), (5).

Further, when the angular speed indicating the rotating speed of the camera is outputted as the camera shake quantity from the camera shake detection circuit 3, the amount of camera shake due to parallel movements of the camera can not be detected. Hence, if the image magnification is greater than a predetermined value irrespective of the camera shake quantity, the alarming sound can be emitted unconditionally. This serves also as an alarm prompting the photographer to use a tripod.

Figure 4:
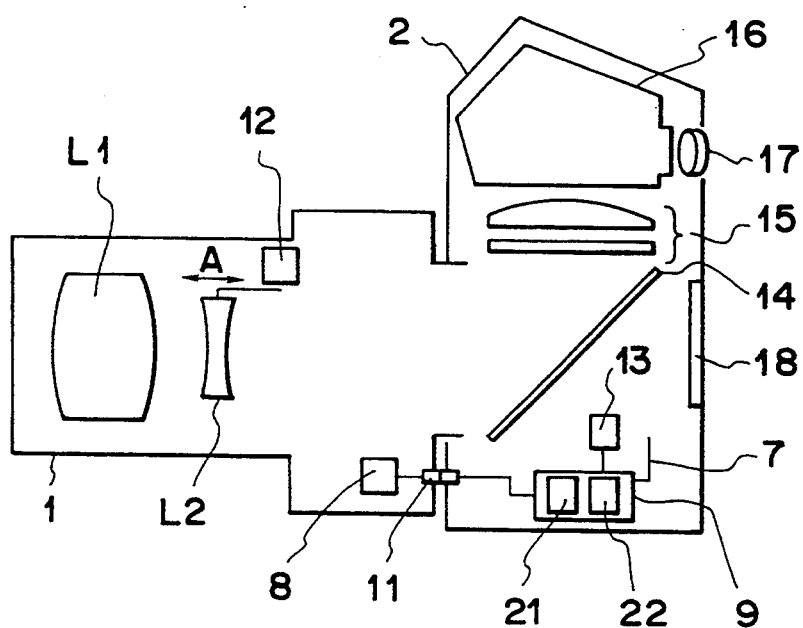
FIG. 4 is a block diagram illustrating a construction of a second embodiment of a camera to which the camera shake alarming apparatus of this invention is applied.

Next, FIG. 4 is a block diagram illustrating a construction of a second embodiment of the camera to which the camera shake alarming apparatus of this invention is applied. The portions corresponding to those shown in FIG. 1 are marked with the like symbols in FIG. 4. A shutter speed calculation circuit 21 calculates the maximum shutter speed among the shutter speeds $t_c$ which meet the formula (6) from the subject distance a detected by the subject distance detection circuit 12 as well as from the focal length F stored in the storage portion 8. The maximum shutter speed is outputted as an allowable shutter speed $t_p$ to a comparing circuit 22.

Note that the camera shake quantity (angular speed) $\omega_1$ in the formula (6) in this case involves the use of a mean (general) camera shake quantity of values obtained by, e.g., a test.

The comparing circuit 22 compares the shutter speed set in the camera with the allowable shutter speed $t_p$ calculated by the shutter speed calculation circuit 21. If the shutter speed set in the camera is larger (slower) than the allowable shutter speed $t_p$, the control signal is outputted to the alarming circuit 13.

Figure 5:
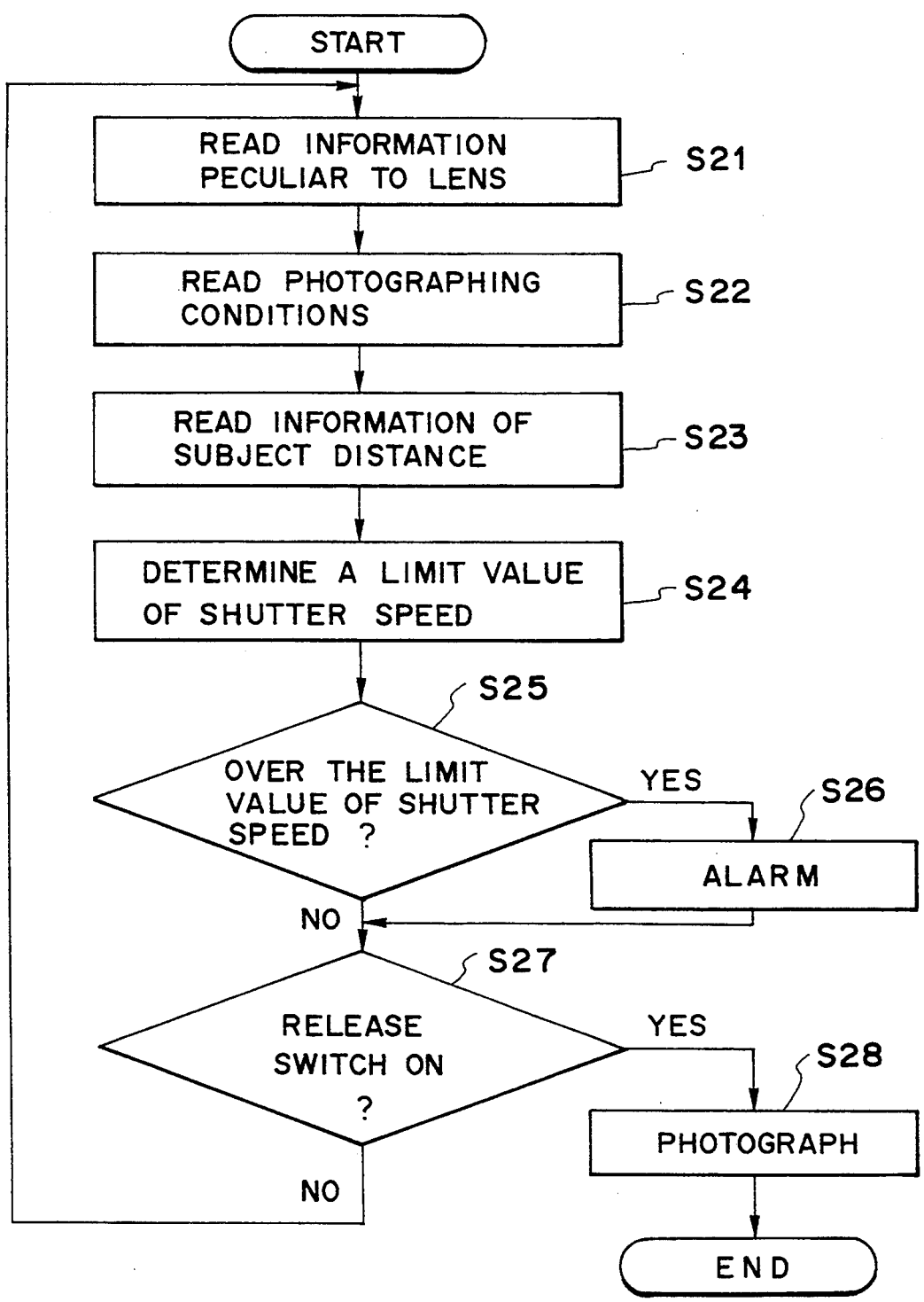
FIG. 5 is an explanatory flowchart showing the operation of the embodiment shown in FIG. 4.

Next, the operation thereof will be explained with reference to a flowchart of FIG. 5. When turning ON the main switch of the camera, the focal length stored in the storage portion 8 is read and outputted to the shutter speed calculation circuit 21 in step S21. The action then proceeds to step S22. In step S22, the camera set shutter speed contained in the photographing condition information 7 is read to the comparing circuit 22. The action then proceeds to step S23. The subject distance detection circuit 12 calculates the subject distance from a position of the focus lens group L2. The subject distance is read to the shutter speed calculation circuit 21, and the action goes forward to step S24.

In step S24, the allowable shutter speed is, as described above, calculated by the shutter speed calculation circuit 21 from the focal length and the subject distance. The action then proceeds to step S25. Judged therein is whether or not the camera set shutter speed read to the comparing circuit 22 is larger (slower) than the allowable shutter speed calculated in step S24. If it is judged in step S25 that the shutter speed set in the camera is not larger than the allowable shutter speed, the action skips over step S26 to step S27.

If it is judged in step S25 that the shutter speed set in the camera is larger than the allowable shutter speed, the action proceeds to step S26. The alarming circuit 13 gives forth the alarming sound.

Then, the action proceeds to step S27, wherein whether the release button is depressed (fully depressed) or not is judged. If it is judged in step S27 that the release button is not depressed, the action goes back to step S21. The actions from step S1 to step S9 are repeated till the depression of the release button is judged in step S27.

If it is judged in step S27 that the release button is depressed, the action goes forward to step S28. The shutter is propelled, and the film 18 is thereby exposed, viz., a photo is taken. The action comes to an end.

Herein, in accordance with the embodiment shown in FIG. 4, the camera body unit 2 incorporates the control module 9 constructed of the shutter speed calculation circuit 21 and the comparing circuit 22. Some or all of these components may be provided in the interchangeable lens unit 1.

Further, in this embodiment also, the camera shake detection circuit 3, the camera shake compensation control circuit 6, the driving circuit 10 and the compensation lens L3 are provided, whereby the camera shake can be detected and compensated as in the embodiment of FIG. 1.

There has been so far explained the case where the camera shake alarming apparatus of this invention is applied to the cameras. In addition to the cameras, the present invention is, however, applicable to, e.g., a video camera for imaging in the form of a motion picture.

Note that the alarming sound is emitted by the alarming circuit 13 in accordance with the control signal transmitted from the comparing circuit 5 or 22 in this embodiment. However, an alarm can be indicated in, e.g., a viewfinder (not shown) of the camera.

According to the camera shake alarming apparatus in one embodiment of the present invention, the subject distance for shooting the subject is detected. The allowable camera shake quantity is calculated based on this subject distance, the shutter speed set in the camera and the camera specification information stored in the storage means. At the same time, the camera shake quantity of the camera is detected. Then, this camera shake quantity of the camera is compared with the allowable camera shake quantity. The alarm, e.g., an alarming sound for the camera shake is given according to the comparison result. It is therefore possible to reliably give an alarm indicating that the image blur is to be produced in the photo because of the camera shake. The occurrence of the image blur in the photo can be thereby prevented beforehand.

According to the camera shake alarming apparatus in another embodiment, the camera shake of the camera is compensated. The calculating means calculates the allowable camera shake quantity on the basis of the shutter speed set in the camera, the camera specification information stored in the storage means, the subject distance detected by the subject distance detecting means and, in addition, the camera shake compensation quantity of the camera. Hence, it is feasible to reliably give the alarm saying that the image blur is to occur on the photo due to the incompletely compensated camera shake.

According to the camera shake alarming apparatus in still another embodiment, the subject distance for photographing the subject is detected. The allowable shutter speed is calculated based on the subject distance and the camera specification information stored in the storage means. Then, the shutter speed set in the camera is compared with the allowable shutter speed. The alarm for the camera shake is given according to the comparison result thereof. It is therefore possible to reliably give the alarm indicating that the image blur is to be produced in the photo due to the camera shake. The image blur can be thereby prevented from appearing on the photo.

It is apparent that a wide range of different working modes can be formed without deviating from the spirit and scope of the invention. This invention is not restricted by the illustrative embodiments, its scope being as set forth in the appended claims.

What is claimed is:

1. A camera shake alarming apparatus comprising:
   storage means for storing specification information of a camera;
   subject distance detecting means for detecting a subject distance for photographing a subject;
   calculating means for calculating an allowable camera shake quantity based on a shutter speed set in said camera when photographing said subject, said camera specification information stored in said storage means and said subject distance detected by said subject distance detecting means;
   camera shake detecting means for detecting a camera shake quantity of said camera;
   comparing means for comparing said allowable camera shake quantity calculated by said calculating means with said camera shake quantity detected by said camera shake detecting means; and
   alarming means for giving an alarm for the camera shake according to a comparison result of said comparing means.

2. The camera shake alarming apparatus according to claim 1, further comprising compensating means for calculating a camera shake compensation quantity based on said camera shake quantity detected by said camera shake detecting means, and for compensating the camera shake of said camera according to said camera shake compensation quantity, wherein said calculating means calculates said allowable camera shake quantity on the basis of said shutter speed set in said camera, said camera specification information stored in said storage means, said subject distance detected by said subject distance detecting means, and said camera shake compensation quantity calculated by said compensating means.

3. The camera shake alarming apparatus according to claim 1, wherein said camera specification information includes a focal length of a lens.

4. The camera shake alarming apparatus according to claim 1, wherein said camera shake quantity detected by said camera shake detecting means is an angular speed at which said camera is tilted.

5. A camera shake alarming apparatus comprising:
   storage means for storing specification information of a camera;
   subject distance detecting means for detecting a subject distance for photographing a subject;
   calculating means for calculating an allowable shutter speed based on said camera specification information stored in said storage means and said subject distance detected by said subject distance detecting means;
   comparing means for comparing a shutter speed set in said camera with said allowable shutter speed calculated by said calculating means; and
   alarming means for giving an alarm for a camera shake according to a comparison result of said comparing means.

* * * * *